United States Patent
Howe et al.

(10) Patent No.: US 12,286,047 B2
(45) Date of Patent: Apr. 29, 2025

(54) DELIVERING FLUID THROUGH A VEHICLE (71) Applicant: Howe & Howe Inc., Waterboro, ME (US)

(72) Inventors: Michael Howe, Biddeford, ME (US); Zachary Edward Sawyer, Alfred, ME (US); Forrest Joel Tripp, Saco, ME (US)

(73) Assignee: Howe & Howe Inc., Waterboro, ME (US)

( * ) Notice: Subject to any disclaimer, the term of this patent is extended or adjusted under 35 U.S.C. 154(b) by 294 days.

(21) Appl. No.: 17/903,355

(22) Filed: Sep. 6, 2022

(65) Prior Publication Data
US 2022/0409938 A1 Dec. 29, 2022

Related U.S. Application Data (63) Continuation of application No. PCT/US2021/021073, filed on Mar. 5, 2021, which is
(Continued)

(51) Int. Cl.
*A62C 27/00* (2006.01)
*A62C 31/00* (2006.01)
(Continued)

(52) U.S. Cl.
CPC .............. *B60P 1/02* (2013.01); *A62C 27/00* (2013.01); *A62C 31/00* (2013.01); *A62C 31/005* (2013.01);
(Continued)

(58) Field of Classification Search
CPC ......... A62C 27/00; A62C 31/00; A62C 31/24; A62C 35/58; A62C 35/68; A62C 31/005; F16L 57/04; B25J 5/005; B62D 55/06
See application file for complete search history.

(56) References Cited

U.S. PATENT DOCUMENTS 2,325,355 A 7/1943 Yost
2,360,397 A 10/1944 Carpenter
(Continued)

FOREIGN PATENT DOCUMENTS

DE 1409740 7/1964
JP 63177876 7/1988
(Continued)

OTHER PUBLICATIONS

Notification Concerning Transmittal of Copy of International Preliminary Report on Patentability for International Application No. PCT/US2021/021073, date of mailing Sep. 15, 2022, 9 pages.
(Continued)

*Primary Examiner* — Jacob M Amick
(74) *Attorney, Agent, or Firm* — BainwoodHuang (57) ABSTRACT

A vehicle includes a body defining a front, a rear, lateral sides extending between the front and the rear. The vehicle further includes a fluid delivery system supported by the body. The fluid delivery system includes an intake manifold disposed at the rear, the intake manifold being constructed and arranged to receive fluid from at least one external fluid source, an outlet disposed at the front, the outlet being constructed and arranged to distribute fluid from the at least one fluid source to an external target, and a fluid conduit coupled with the intake manifold and the outlet to convey the fluid from the intake manifold to the outlet through the body. The vehicle further includes track assemblies coupled with the body, the body being disposed between the track assemblies to enable the track assemblies to provide stability to the vehicle during high speed fluid discharge from the outlet.

20 Claims, 6 Drawing Sheets

Related U.S. Application Data a continuation of application No. 17/192,236, filed on Mar. 4, 2021, now Pat. No. 11,345,267.

(60) Provisional application No. 62/986,143, filed on Mar. 6, 2020.

(51) Int. Cl.
| | |
|---|---|
| *B25J 5/00* | (2006.01) |
| *B25J 11/00* | (2006.01) |
| *B60K 13/02* | (2006.01) |
| *B60P 1/02* | (2006.01) |
| *B60P 3/00* | (2006.01) |
| *B60T 7/12* | (2006.01) |
| *B62D 21/09* | (2006.01) |
| *B62D 55/06* | (2006.01) |
| *F02M 35/10* | (2006.01) |
| *F02M 35/104* | (2006.01) |
| *F16D 65/28* | (2006.01) |
| *B60P 3/16* | (2006.01) |
| *F16D 121/16* | (2012.01) |

(52) U.S. Cl.
CPC .............. *B25J 5/005* (2013.01); *B25J 11/008* (2013.01); *B60K 13/02* (2013.01); *B60P 3/00* (2013.01); *B60T 7/12* (2013.01); *B62D 21/09* (2013.01); *B62D 55/06* (2013.01); *F02M 35/10242* (2013.01); *F02M 35/104* (2013.01); *F16D 65/28* (2013.01); *B60P 3/16* (2013.01); *F16D 2121/16* (2013.01)

(56) References Cited

U.S. PATENT DOCUMENTS

| | | | |
|---|---|---|---|
| 3,762,478 A | * | 10/1973 | Cummins ............ A62C 27/00 |
| | | | 169/25 |
| 4,037,664 A | | 7/1977 | Gibson |
| 5,488,995 A | | 2/1996 | Kuwahara |
| 6,289,995 B1 | | 9/2001 | Fuller |
| 7,520,411 B2 | | 4/2009 | Bieker |
| 8,474,554 B2 | | 7/2013 | Howe et al. |
| 9,764,174 B2 | | 9/2017 | Howard, Sr. |
| 9,873,468 B2 | | 1/2018 | Howe et al. |
| 10,745,065 B2 | | 8/2020 | Howe et al. |
| D923,513 S | | 6/2021 | Howe et al. |
| D926,631 S | | 8/2021 | Howe et al. |
| D927,352 S | | 8/2021 | Howe et al. |
| 2020/0377161 A1 | | 12/2020 | Sawyer et al. |
| 2020/0377162 A1 | | 12/2020 | Howe et al. |
| 2021/0108895 A1 | | 4/2021 | Howe et al. |

FOREIGN PATENT DOCUMENTS

| | | |
|---|---|---|
| JP | 63174857 | 11/1988 |
| KR | 101400770 | 5/2014 |
| KR | 20160139305 A | 12/2016 |
| WO | 2021072356 | 4/2021 |

OTHER PUBLICATIONS

First Examination Report for UAE Application No. P6000289/2022, date of mailing Oct. 6, 2024, 6 pages.

* cited by examiner

DELIVERING FLUID THROUGH A VEHICLE

CROSS REFERENCE TO RELATED APPLICATIONS

This application is a continuation of earlier-filed International Application No. PCT/US2021/021073 filed on Mar. 5, 2021, entitled "Delivering Fluid through a Vehicle", the contents and teachings of which are hereby incorporated by reference in their entirety.

Additionally, this application claims priority to and/or the benefit of earlier-filed U.S. application Ser. No. 17/192,236 filed on Mar. 4, 2021, entitled "Delivering Fluid through a Vehicle", the contents and teachings of which are hereby incorporated by reference in their entirety.

Furthermore, this application claims priority to and/or the benefit of earlier-filed U.S. Application No. 62/986,143 filed on Mar. 6, 2020, entitled "Methods and Apparatus for Vehicle", the contents and teachings of which are hereby incorporated by reference in their entirety.

BACKGROUND

Vehicular robots may be used in dangerous situations rather than risk human injury/life. For example, the nozzle end of a firehose may be attached to such a robot in order to apply water to an unsafe structure such as a burning object.

During operation, a human operator remotely controls the robot from a safe distance. In particular, while the nozzle end of the firehose is attached to the robot, the human operator may drive the robot to within spraying range of the unsafe structure and spray water from the nozzle over the unsafe structure.

SUMMARY

Improved techniques utilize a fluid delivery assembly to transfer fluid through a vehicle. Such a fluid delivery assembly enables high capacity fluid routing from a back of the vehicle to a front of the vehicle in a manner that avoids interfering with other vehicle equipment such as the vehicle engine, the fuel tank, specialized equipment mounted to the top and/or sides of the vehicle, etc. Moreover, such a fluid delivery assembly may sit immediately on top of (or be flush with) a floor of the vehicle (e.g., while cushioned and/or suspended by a compliant liner) to provide the vehicle with a low center of gravity for enhanced stability during driving, during delivery of fluid to a target, combinations thereof, etc.

One embodiment is directed to a vehicle which includes a floor plate defining a front and a back of the vehicle, a set of wall sections constructed and arranged to receive vehicle loading and transfer the vehicle loading to the floor plate, and a fluid delivery assembly supported by the floor plate. The fluid delivery assembly includes an intake manifold that resides adjacent the back of the vehicle, an outlet that resides adjacent the front of the vehicle, and a set of lateral conduits extending between the intake manifold and the outlet to laterally convey fluid entering the intake manifold from a fluid source to the outlet for delivery to a fluid target. Accordingly, the back of the vehicle may connect to the fluid source and the front of the vehicle may deliver the fluid thus keeping the vehicle sides and top available for other uses (e.g., unblocked camera views, fire retardant spraying, etc.). Moreover, the low isolated placement of the fluid delivery assembly not only safeguards the fluid delivery assembly but also provides a low center of gravity to improve vehicle stability.

Another embodiment is directed to a fluid delivery assembly to transfer fluid through a vehicle. The fluid delivery assembly includes:
(A) an intake manifold to reside adjacent a back of the vehicle;
(B) an outlet to reside adjacent a front of the vehicle; and
(C) a set of lateral conduits extending between the intake manifold and the outlet to laterally convey fluid entering the intake manifold from a fluid source to the outlet for delivery to a fluid target.

Yet another embodiment is directed to a method of delivering fluid. The method includes:
(A) intaking the fluid through an intake manifold that resides adjacent a back of a vehicle,
(B) releasing the fluid from an outlet that resides adjacent a front of the vehicle, the fluid flowing from the intake manifold through a set of lateral conduits extending horizontally along a floor plate of the vehicle and between the intake manifold and the outlet to the outlet; and
(C) while fluid is continuing to be released from the outlet, driving the vehicle over a ground surface.

In some arrangements, the floor plate further defines a left side and a right side of the vehicle. Additionally, the set of wall sections includes a left wall section residing along the left side of the vehicle and a right wall section residing along the right side of the vehicle. Furthermore, the set of lateral conduits includes a left conduit that extends along the left side of the vehicle and a right conduit that extends along the right side of the vehicle.

In some arrangements, the floor plate and the left wall section define a horizontal left channel through which the left conduit extends. Additionally, the floor plate and the right wall section define a horizontal right channel through which the right conduit extends.

In some arrangements, the floor plate includes a pan section, left lower cradles coupled with the pan section along the left side of the vehicle, and right lower cradles coupled with the pan section along the right side of the vehicle. Additionally, the left conduit is held between the left lower cradles and the left wall section. Furthermore, the right conduit is held between the right lower cradles and the right wall section.

In some arrangements, the left conduit includes a left side section that extends horizontally along the left side of the vehicle and a left front section that extends from an end of the left side section toward the outlet. Additionally, the right conduit includes a right side section that extends horizontally along the right side of the vehicle and a right side section that extends from an end of the right side section toward the outlet. Furthermore, the floor plate further includes a set of front cradles coupled with the pan at the front of the vehicle, the set of front cradles being constructed and arranged to hold left and right front sections in place during fluid delivery.

In some arrangements, the vehicle further includes vehicle equipment supported by a central region of the pan section. The left and right conduits extend along a periphery of the pan section and around the central region to avoid the vehicle equipment.

In some arrangements, each of the left channel and the right channel has a minimum channel diameter. Additionally, each of the left conduit and the right conduit has a maximum conduit width. Furthermore, the minimum channel diameter is greater than the maximum conduit width to prevent left and right conduits from bearing any of the vehicle loading applied to the left and right wall sections.

In some arrangements, the vehicle further includes left vehicle equipment which resides within a left set of cavities defined by the left wall section, the left vehicle equipment providing left vehicle loading that the left wall section isolates from the left conduit. Additionally, the vehicle further includes right vehicle equipment which resides within a right set of cavities defined by the right wall section, the right vehicle equipment providing right vehicle loading that the right wall section isolates from the right conduit.

In some arrangements, the vehicle further includes left equipment decking supported by the left wall section, the left equipment decking being constructed and arranged to receive left vehicle loading that the left wall section isolates from the left conduit. Additionally, the vehicle further includes right equipment decking supported by the right wall section, the right equipment decking being constructed and arranged to receive right vehicle loading that the right wall section isolates from the right conduit.

In some arrangements, the left wall section includes a left wall frame and a left drive wheel that rotates relative to the left wall frame. Additionally, the right wall section includes a right wall frame and a right drive wheel that rotates relative to the right wall frame. Furthermore, the left and right drive wheels rotate to provide vehicle propulsion.

In some arrangements, the vehicle further includes a left track assembly disposed along the left side of the vehicle, and a right track assembly disposed along the right side of the vehicle. The left and right track assemblies are constructed and arranged to provide tracked vehicle movement over a ground surface while the fluid delivery assembly concurrently delivers fluid from a fluid source coupled with the intake manifold to an output device coupled with the outlet.

In some arrangements, the left and right conduits extend horizontally below tops of the left and right track assemblies to provide a low center of gravity to the vehicle. The low center of gravity inhibits uncontrolled movement of the vehicle (e.g., lurching, torquing, etc. due to recoil) while driving the vehicle, while aiming fluid at a target, and so on.

In some arrangements, the vehicle further includes a plurality of input ports coupled with the intake manifold. Each input port faces an outward direction away from the back of the vehicle.

In some arrangements, the outlet faces upward in a direction that is perpendicular to the outward direction away from the back of the vehicle. Such geometry provides effective routing of the fluid through the vehicle without interfering with other equipment, blocking access, etc.

Other embodiments are directed to apparatus, devices, assemblies, and so on. Some embodiments are directed to various methods, systems, and componentry which are involved in delivering fluid through a vehicle.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique utilizes a fluid delivery assembly to transfer fluid through a vehicle. Such a fluid delivery assembly enables high capacity fluid routing from a back of the vehicle to a front of the vehicle in a manner that avoids interfering with other vehicle equipment such as the vehicle engine, the fuel tank, specialized equipment mounted to the top and/or sides of the vehicle, etc. Moreover, such a fluid delivery assembly may sit immediately on top of (or be flush with) a floor of the vehicle (e.g., while cushioned and/or suspended by a compliant liner) to provide the vehicle with a low center of gravity for enhanced stability during driving, during delivery of fluid to a target, combinations thereof, etc.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
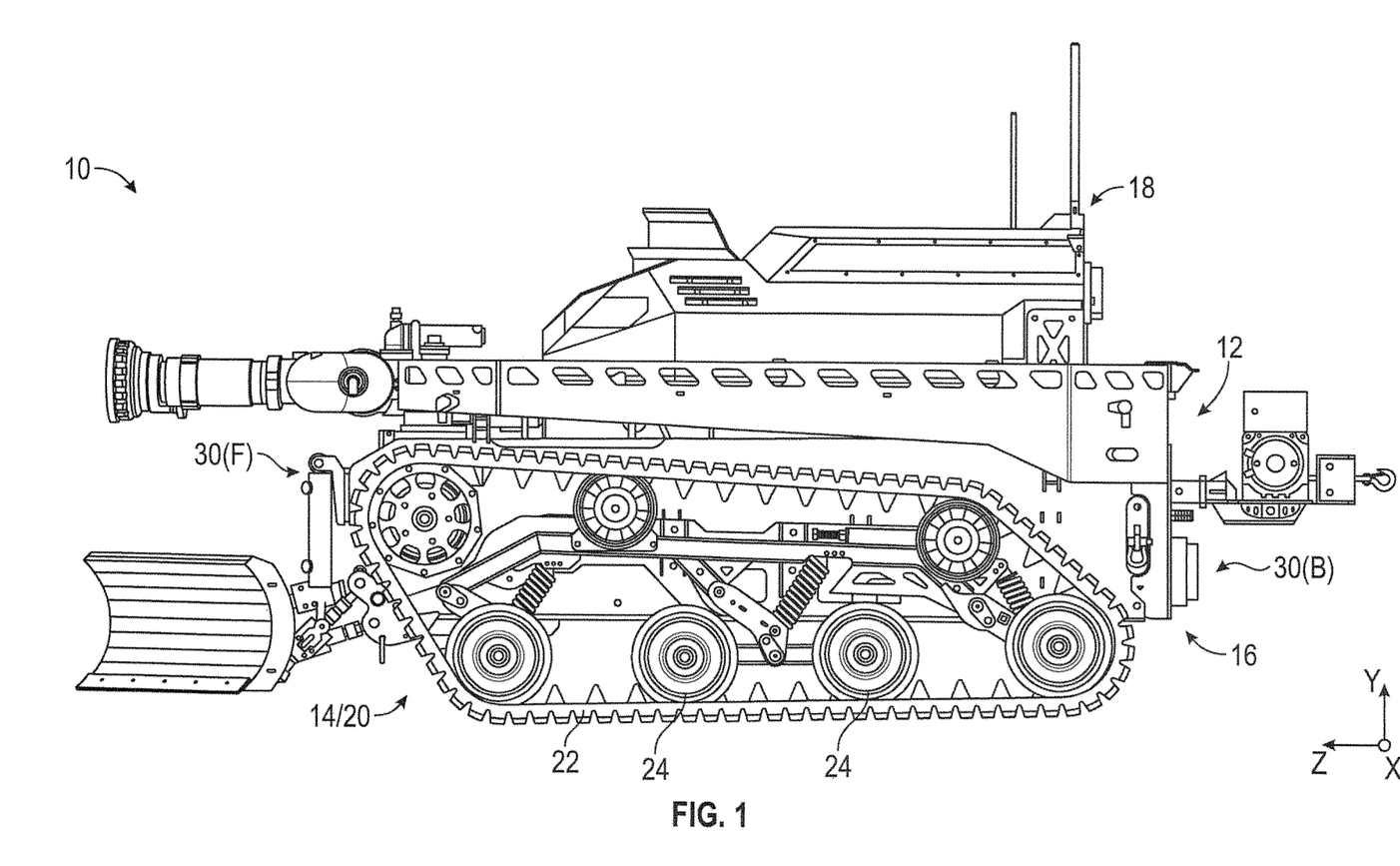
FIG. 1 is a side view of a vehicle which utilizes a fluid delivery assembly in accordance with certain embodiments.

FIG. 1 shows a vehicle 10 which utilizes a fluid delivery assembly in accordance with certain embodiments. The vehicle 10 includes a vehicle body 12, a suspension 14, a fluid delivery assembly 16, and additional equipment 18.

The vehicle body 12 is constructed and arranged to carry various loads such as an engine, a fuel tank, fluid deployment equipment, electronics, cargo, specialized robotics, camera/sensor equipment, other types of equipment, combinations thereof, and so on. It should be understood that the vehicle body 12 may have different geometries, weights/sizes/scales/etc., footprints, purposes, and so on, which are different than those shown in FIG. 1.

The suspension 14 is constructed and arranged to provide tracked vehicle movement thereby enabling the vehicle 10 to easily maneuver over a variety of terrains such as pavement, soil, rocks, ditches, debris, icy or wet surfaces, and so on in the manner similar to that of a tank. To this end, the suspension 14 includes multiple track assemblies 20. Each track assembly 20 includes a continuous track 22 and a set of wheels 24. The track 22 of each track assembly 20 is driven by an engine, a transmission, etc. The set of wheels 24 provides drive and guidance to control movement of the continuous track 22. For example, the set of wheels may include a drive wheel (or sprocket) that drives the track 22, idler wheels to support and guide the track 22, and so on.

In accordance with certain embodiments, the suspension 14 includes (i) a left track assembly 20 having a left track 22 and a set of left wheels 24 controlling the left track 22, and (ii) a right track assembly 20 having a right track 22 and a set of right wheels 24 controlling the right track 22.

It should be understood that the suspension 14 may include other componentry 30 as well. Suitable examples for such other componentry 30 include one or more of the following: support beams, shock absorbers, other hydraulics, bogies, struts, track guides, springs, other wheels, hardware, and so on.

Moreover, although the vehicle 10 is shown as a tracked vehicle, other vehicle types are suitable for use as well such as a vehicle that uses regular tires, skis or sleds members, robotic feet, combinations thereof, and so on. Furthermore, the vehicle 10 may be a non-land vehicle such as a watercraft, an aircraft, a hybrid craft, etc.

The fluid delivery assembly 16 is constructed and arranged to provide fluid routing from a back side (or simply back) 30(B) of the vehicle 10 to a front side (or simply front) 30(F) of the vehicle 10 in a manner that avoids interfering with other vehicle equipment such as the vehicle engine, the fuel tank, specialized equipment mounted to the top and/or sides of the vehicle, etc. As will be explained in further detail shortly, the fluid delivery assembly 16 may sit immediately on top of (or be flush with) a floor of the vehicle 10 (e.g., cushioned/suspended by a compliant liner) to provide the vehicle 10 with a low center of gravity (i.e., low along the Y-axis) for enhanced stability during driving, during delivery of fluid to a target, combinations thereof, etc.

The additional equipment 18 represents componentry, machinery, etc. for performing vehicle operations and/or accessories for performing non-vehicle operations. Examples of such additional equipment 18 include an oil reservoir, batteries, vehicle control and communications circuitry, an engine cooling system, a plow, a utility deck/platform, extending arms, other robotics, etc.

During operation, the vehicle 10 is able to move over a ground surface (or terrain) as well as deliver fluid to a target. To move over the ground surface, the vehicle 10 receives and responds to a remote control signal from a human operator operating a controller. To deliver fluid to a target, one end of the fluid delivery assembly 16 at the back 30(B) of the vehicle 10 connects to a fluid source (e.g., a firehose leading to a hydrant, fluid tank, a service vehicle, etc.) and another end of the fluid delivery assembly 16 at the front 30(F) releases the fluid to the target. Such delivery of the fluid to the target (e.g., starting delivery, stopping delivery, aiming the fluid, changing a delivery spray pattern, etc.) may be controlled remotely by the human operator as well.

It should be understood that the vehicle 10 is capable of driving over terrain and delivering fluid simultaneously. It should be further understood that the vehicle 10 may be manually operated via local controls at the vehicle 10 itself. Further details will now be provided with reference to FIGS. 2 and 3.

Figure 2:
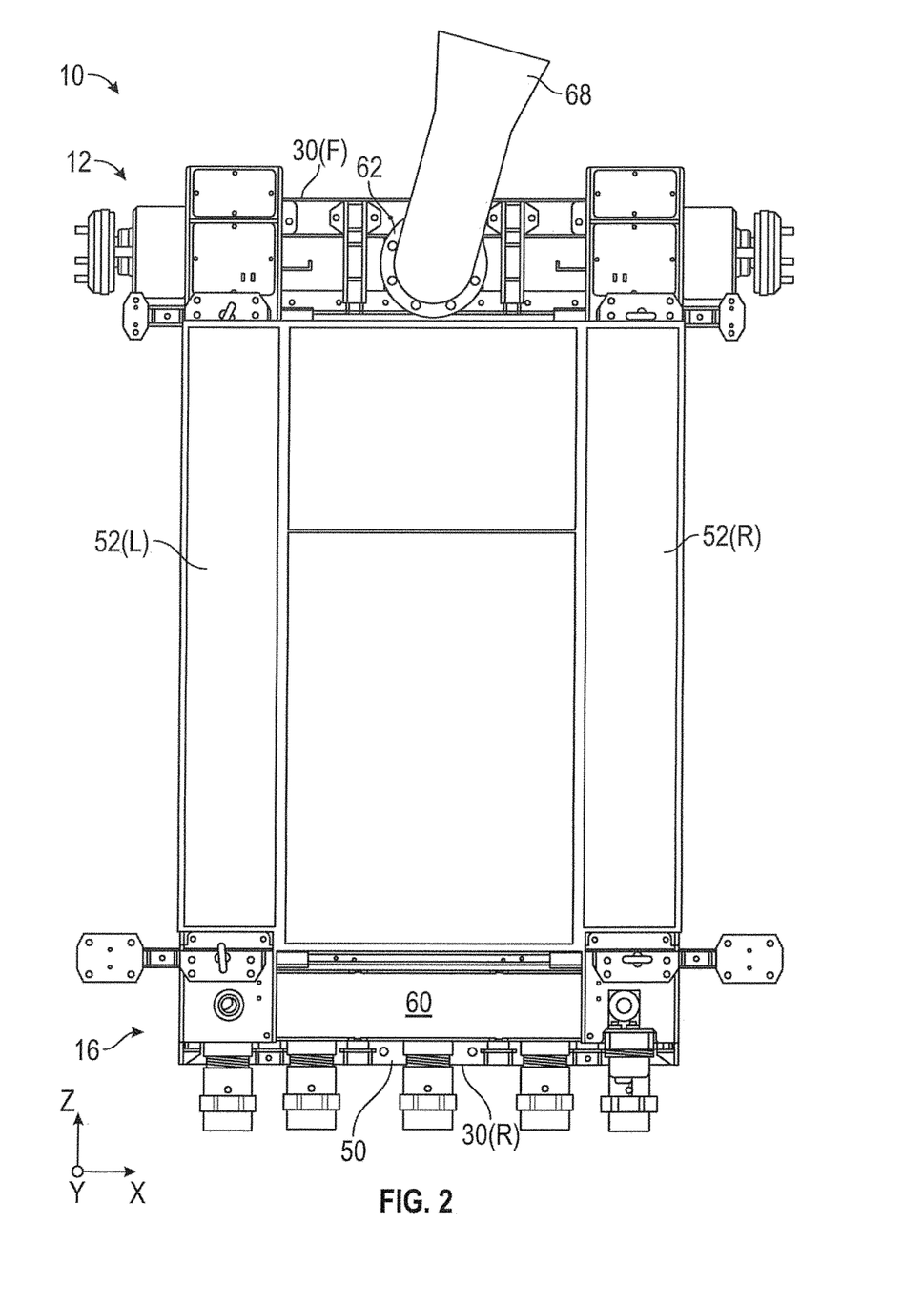
FIG. 2 is a top view showing the certain portions of a vehicle in accordance with certain embodiments.
Figure 3:
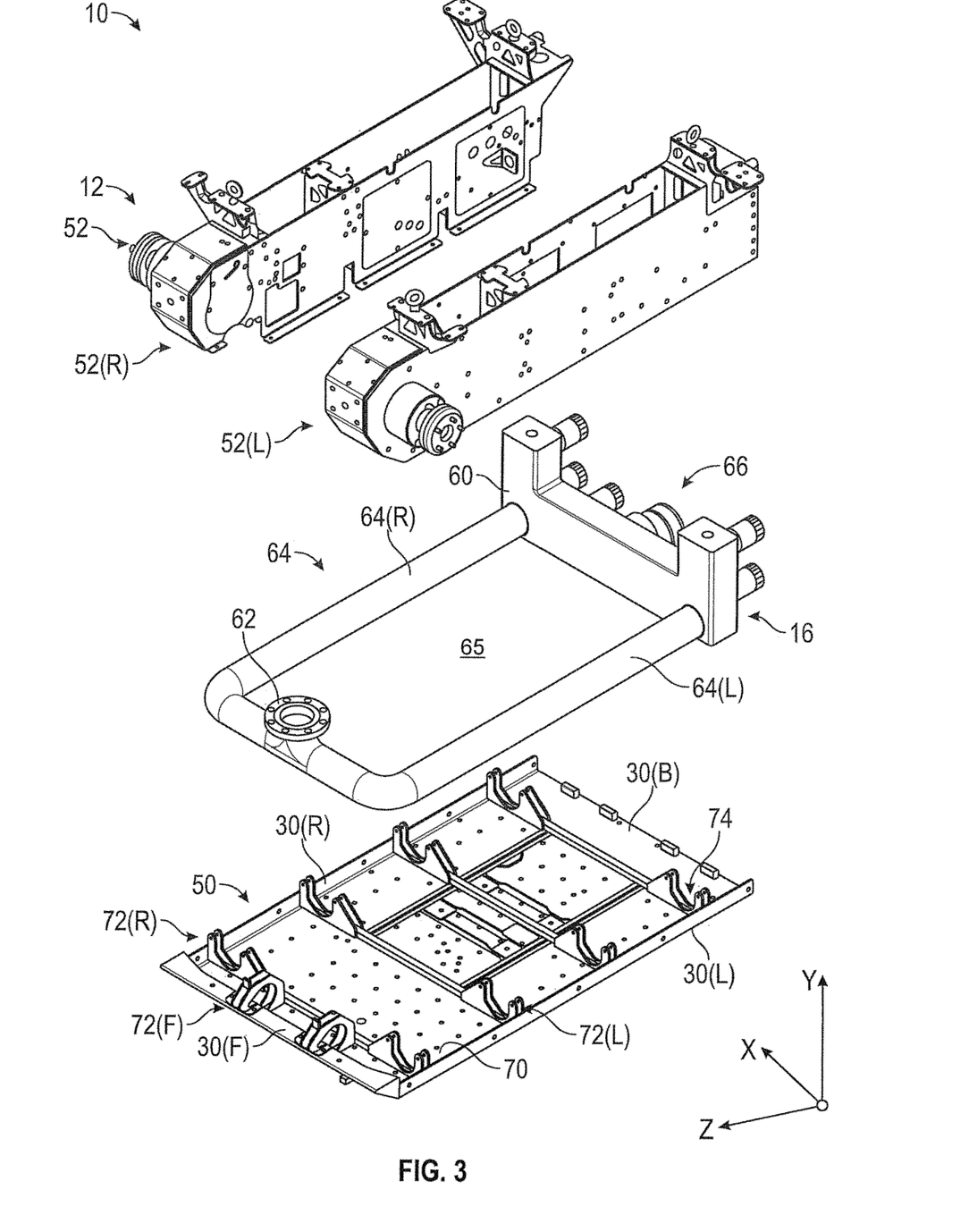
FIG. 3 is an exploded view showing certain portions of a vehicle in accordance with certain embodiments.

FIGS. 2 and 3 show certain details in accordance with certain embodiments. FIG. 2 shows a top view of certain portions of the vehicle 10. FIG. 3 shows an exploded view of certain portions of the vehicle 10.

The vehicle body 12 includes a floor plate 50 and a set of wall sections 52. The floor plate 50 defines the front 30(F) and the back 30(B) of the vehicle 10 and holds the set of wall sections 52 in place relative to each other (also see FIG. 1). The set of wall sections 52 include a left wall section 52(L) and a right wall section 52(R) which are constructed and arranged to couple with the suspension 14 as well as receive vehicle loading (e.g., weight from some of the additional equipment 18, stresses from maneuvering over uneven terrain, shock from external events, etc.) and may receive some vehicle loading from the floor plate 50.

The fluid delivery assembly 16 includes an intake manifold 60, an outlet 62, and a set of lateral conduits 64. The intake manifold 60 resides adjacent the back 30(B) of the vehicle 10. Additionally, the outlet 62 resides adjacent the front 30(F) of the vehicle 10. Furthermore, the set of lateral conduits 64 extend horizontally (along the Z-axis) between the intake manifold 60 and the outlet 62 to laterally convey fluid entering the intake manifold from a fluid source (e.g., a fire hose supplying water) to the outlet 62 for high capacity delivery to a fluid target. Since the set of lateral conduits 64 are under the set of wall sections 52, the set of lateral conduits 64 are isolated from much or all of the other loading/stresses placed on the set of wall sections 52.

As best seen in the exploded view of FIG. 3, the floor plate 50 further defines a left side 30(L) and a right side 30(R) of the vehicle 10. The left wall section 52(L) is thus situated along the left side 30(L) of the vehicle 10, and the right wall section 52(R) is situated along the right side 30(R) of the vehicle 10. Likewise, the set of lateral conduits 64 includes a left conduit 64(L) that extends horizontally along the left side 30(L) of the vehicle 10 and a right conduit 64(R) that extends horizontally along the right side 30(R) of the vehicle 10.

In accordance with certain embodiments, each conduit 64 is made of one or more high strength materials capable of sustaining high capacity fluid flow between the intake manifold and the outlet 62. Suitable high strength materials include iron and/or steel. However, other materials such as PVC, PEX, carbon fiber, other materials that do not fail under high fluid pressure, combinations thereof, etc. may be used in the alternative or in combination.

It should be appreciated that the loop-shaped geometry of the fluid delivery assembly 16 enables fluid to travel from the back 30(B) to the front 30(F) through multiple paths along the periphery of the floor plate 50. Accordingly, there is no interference with any equipment residing in the interior of the loop, see the region 65 in FIG. 3.

In accordance with certain embodiments, the wall sections 52 and the floor plate 50 operate to concurrently hold the fluid delivery assembly 16, but isolate the fluid delivery assembly 16 from vehicle loading and other stresses such as the weight of equipment borne by the wall sections 52, movements between the floor plate 50 and the wall sections 52, etc. To this end, the floor plate 50 and the left wall section 52(L) define a horizontal left channel through which the left conduit 64(L) extends. Similarly, the floor plate 50 and the right wall section 52(R) define a horizontal right channel through which the right conduit 64(R) extends. The horizontal channels have diameters that are larger than the widths of the conduits 64 to decouple the fluid delivery assembly 16 from stresses applied to the vehicle 10 while nevertheless encircling the conduits 64. Accordingly, the various portions of the vehicle 10 may flex under high loads, but consequent flexure of the fluid delivery assembly 16 is largely attenuated.

In some arrangements, the floor plate 50 includes a pan section 70, left lower cradles 72(L), right lower cradles 72(R), and front cradles 72(F). The cradles 72(L), 72(R), 72(F) couple with the pan section 70 and are lined with compressible material 74 (e.g., rubber, air-filled material, gel, foam, other compliant lining material, combinations thereof, etc.) to provide compliance/cushioning to the conduits 64.

Furthermore, in certain arrangements, the front cradles 72(F) fully encircle front sections of the conduits 64 and may be lined with the compressible material 74 as well. Accordingly, the front cradles 72(F) are able to hold the fluid delivery assembly 16 in place while further decoupling the fluid delivery assembly 16 from stresses applied to the vehicle 10.

In accordance with certain embodiments, the undersides of the wall sections 52 are provisioned with similar cradling features and/or dampening/cushioning materials 74. Accordingly, as between the fluid delivery assembly 16 and the floor plate 50, any forces between the fluid delivery assembly 16 and the wall sections 52 result in gentle retention rather than stresses that could otherwise damage the fluid delivery assembly 16.

It should be appreciated that locating the fluid delivery assembly 16 between the floor plate 50 and the wall sections 52 enables the weight of the fluid delivery assembly 16 to contribute to the low center of gravity of the vehicle 10. Along these lines, the intake manifold 60, the outlet 62, the conduits 64 may be made of relatively heavy material (e.g., cast iron, steel, etc.) thus enabling the fluid delivery assembly 16 and any fluid therein to stabilize the vehicle 10. Accordingly, the vehicle 10 is less susceptible to rocking, and possibly tipping over in response to riding over uneven terrain, recoil from initiating fluid delivery, combinations thereof, etc.

As further shown in FIGS. 2 and 3, the fluid delivery assembly 16 further includes a plurality of input ports 66 coupled with the intake manifold 60. Each input port 66 faces an outward direction away from the back 30(B) of the vehicle 10 (e.g., the negative Z-direction). The use of multiple input ports 66 enables a variety of uses such as combining the full flow capacities from multiple fluid sources to generate higher capacity through the vehicle 10, mixing different fluids within the intake manifold 60, selecting between different fluids, and so on.

Additionally, the fluid delivery assembly 16 further includes a delivery device 68 coupled with the outlet 62. The outlet 62 faces upward in a direction (e.g., the positive Y-direction) that is perpendicular to the outward direction away from the back of the vehicle. Such orientation enables the delivery device 68 (e.g., a sprayer or monitor, also see FIG. 1) to provide rich and reliable control over fluid direction with no restrictions (e.g., full rotational control about a vertical axis, unrestricted azimuth/elevation control when pointing the delivery device 68, etc.). Further details will now be provided with reference to FIGS. 4 and 5.

Figure 4:
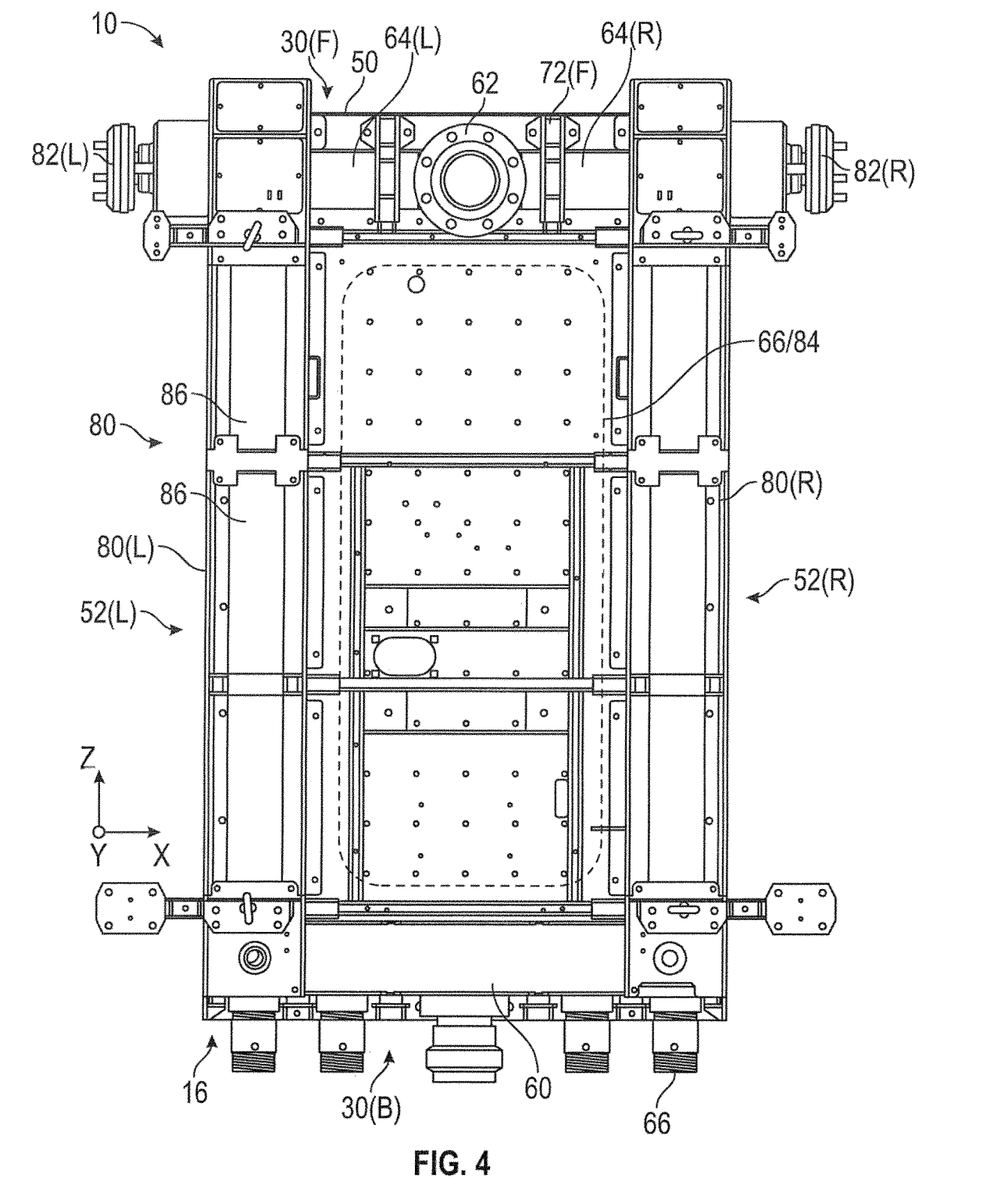
FIG. 4 is an example cutaway view showing example details in accordance with certain embodiments.
Figure 5:
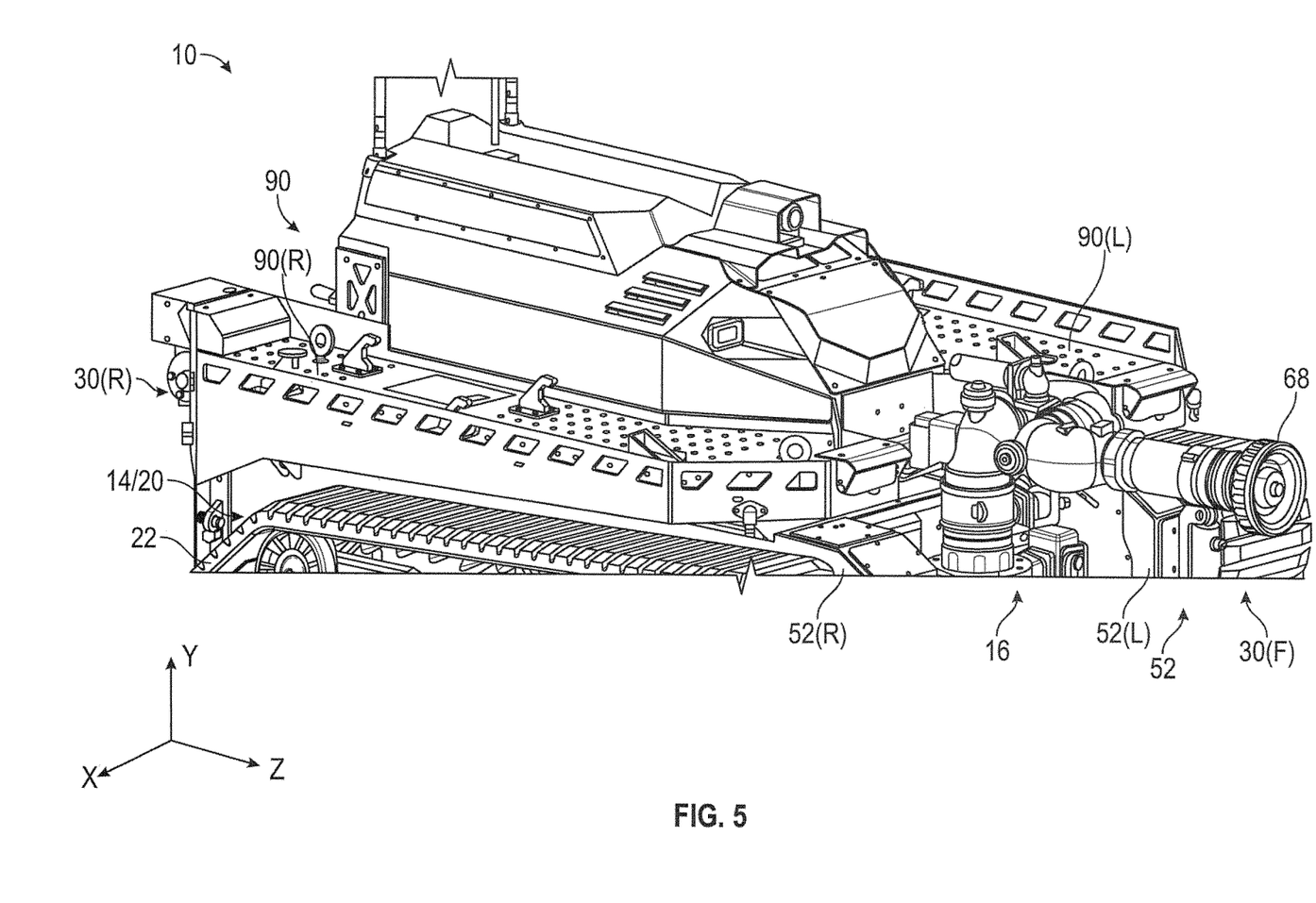
FIG. 5 is a perspective view showing other example details in accordance with certain embodiments.

FIGS. 4 and 5 show certain example vehicle loading details in accordance with certain embodiments. FIG. 4 identifies various example locations for various components of the vehicle 10. FIG. 5 shows a view of a utility deck for supporting one or more vehicle accessories.

As best seen in FIG. 4, the wall sections 52 include frames 80 and drive wheels 82 that rotate relative to the frames 80 to drive the tracks 22 of the suspension 14 (also see FIG. 1). In particular, the wall section 52(L) includes a frame 80(L) and a drive wheel 82(L). Similarly, the wall section 52(R) includes a frame 80(R) and a drive wheel 82(R).

The frames 80 are constructed and arranged to provide certain features such as defining a protected interior space (or central region) 84 within the vehicle 10 (also see the area 65 between the conduits 64 in FIG. 3) to house certain components such as the engine, the engine cooling system, and a hydraulic oil reservoir (or tank). Additionally, each frame 80 defines one or more cavities 86 (or compartments/bays) for containing various componentry such as a set of batteries, electronics (e.g., a controller, communications equipment, etc.), a set of fuel tanks, and so on.

The weight of such equipment is borne by the wall sections 52 and transferred at least in part to the suspension 14 thus preventing the floor plate 50 from having to support the entire weight of all the equipment. However, some of the weight may be transferred to and supported by the floor plate 50 but is nonetheless prevented from imposing stressing on the fluid delivery assembly 16 that could otherwise damage or impact operation of the fluid delivery assembly 16.

As best seen in FIG. 5, the vehicle 10 further includes a set of utility decks 90. Such utility decks 90 not only provide shielding to the vehicle 10, but also serve as a set of platforms on to which other equipment/accessories may be mounted.

It should be appreciated that the weight of the utility decks 90 as well as any other supported equipment is then transferred to the wall sections 52. In accordance with certain embodiments, the wall section 52(L) supports left vehicle decking 90(L), and the wall section 52(R) supports right vehicle decking 90(R) (also see FIG. 3). In turn, such vehicle loading is then transferred, at least in part, to the suspension 14.

It should be further appreciated that the positioning of the fluid delivery assembly 16 enables fluid flow to be channeled from the back 30(B) of the vehicle 10 to the front 30(F) of the vehicle 10 around the vehicle equipment. However, such fluid flow is still contained within the form factor of the vehicle 10 thus protecting it and keeping it out of the way from other structures (e.g., internal equipment, external accessories, etc.). Furthermore, the low placement of the fluid delivery assembly 16 (e.g., the conduits 64 of the fluid delivery assembly 16 are below the tops of the track assemblies 20) contributes to the low center of gravity of the vehicle 10 thus improving vehicle stability. Further details will now be provided with reference to FIG. 6.

Figure 6:
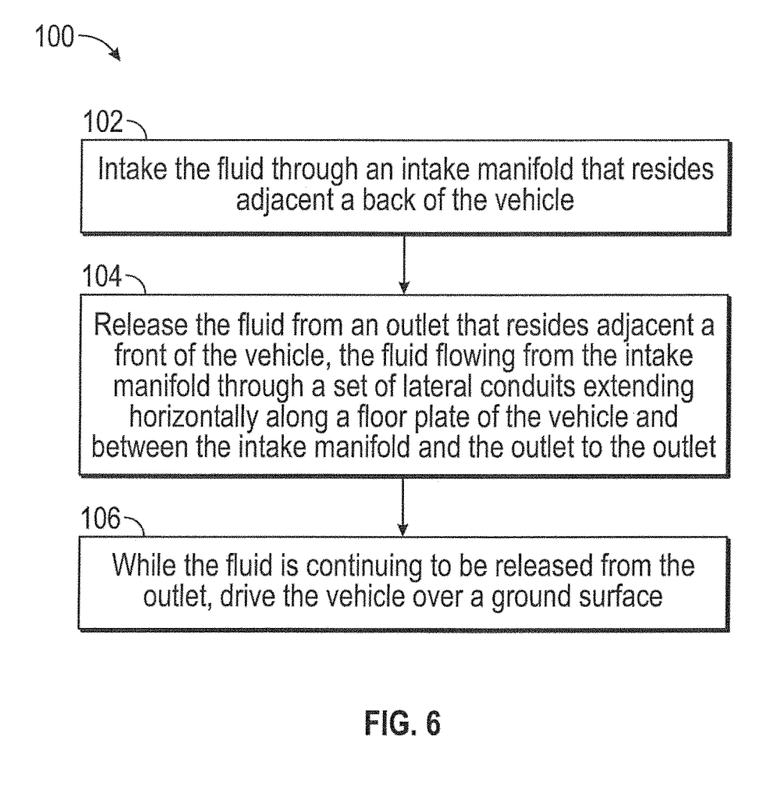
FIG. 6 is a flowchart of a procedure which is performed by a vehicle which utilizes a fluid delivery assembly in accordance with certain embodiments.

FIG. 6 is a flowchart of a procedure 100 which is performed by a vehicle which utilizes a fluid delivery assembly in accordance with certain embodiments. The procedure 100 delivers fluid through the vehicle.

At 102, the vehicle intakes the fluid through an intake manifold that resides adjacent a back of a vehicle. Such fluid may be provided under high pressure from an external source such as a set of firehoses connected to a set of water sources.

At 104, the vehicle releases the fluid from an outlet that resides adjacent a front of the vehicle. The fluid flows from the intake manifold through a set of lateral conduits extending horizontally along a floor plate of the vehicle and between the intake manifold and the outlet to the outlet.

At 106, while fluid is continuing to be released from the outlet, the vehicle drives over a ground surface. It should be appreciated that a low placement of the various components of the fluid delivery assembly lowers the center of gravity of the vehicle thus enabling the vehicle to maneuver effectively over various ground surfaces (e.g., marshes, ditches, rocky terrain, etc.) while concurrently delivering the fluid.

As described above, improved techniques utilize a fluid delivery assembly 16 to transfer fluid through a vehicle 10. Such a fluid delivery assembly 16 enables high capacity fluid routing from a back 30(B) of the vehicle 10 to a front 30(F) of the vehicle 10 in a manner that avoids interfering with other vehicle equipment such as the vehicle engine, the fuel tank, specialized equipment mounted to the top and/or sides of the vehicle 10, etc. Moreover, such a fluid delivery assembly 16 may sit immediately on top of (or be flush with) a floor plate 50 of the vehicle 10 (e.g., while cushioned and/or suspended by a compliant liner) to provide the vehicle with a low center of gravity for enhanced stability during driving, during delivery of fluid to a target, combinations thereof, etc.

While various embodiments of the present disclosure have been particularly shown and described, it will be understood by those skilled in the art that various changes in form and details may be made therein without departing from the spirit and scope of the present disclosure as defined by the appended claims.

In accordance with certain embodiments, the above described techniques provide for an isolated water manifold for a vehicle chassis. Such a system is suitable generally for vehicle designs, and more particularly for a platform for a firefighting vehicle.

In accordance with certain embodiments, the wall sections serve as chassis side wall pods. Along these lines, such pods are the structural components that take the loads from the suspension of the vehicle and support the weight of any payloads attached to the top of the vehicle.

Additionally, in accordance with certain embodiments, the floor plate serves as a chassis floor pan. Along these lines, the floor pan is the base which connects all of the components together.

Furthermore, in accordance with certain embodiments, the fluid delivery assembly serves as an isolated pressure vessel. In certain arrangements, such a pressure vessel needs to be robust enough to handle water pressure from the fire trucks and have enough capacity to flow 2500 GPM of water. Such needs to be isolated from the chassis so the full loads of the chassis are not being translated through the pressure vessel. To accomplish this, the fluid delivery assembly may be built separately and installed inside the chassis where it is isolated with rubber mounts.

Also, in accordance with certain embodiments, the monitor is kept as low as possible on the platform to minimize effect of thrust produced by the 2500 GPM nozzle. Not only do the disclosed techniques enable such a feature, the disclosed techniques provide for space to package all of the components that allow the platform to function and move which drives the shape of the pressure vessel.

It should be understood that, in certain conventional situations, a water monitor may be mounted on top of a vehicle and the hoses connect on the top of the vehicle. However, if the size of the monitor were increased and the flow capacity were increased, the current weight of the vehicle may be insufficient to keep the vehicle stable particularly when spraying water due to the thrust generated by the monitor.

In contrast, the improvement fluid delivery assembly 16 and/or is associated vehicle integration features provides rich and robust stability. In accordance with certain embodiments, for water delivery, water hoses connect to the rear of the vehicle and the water monitor resides at the front of the vehicle and sits close to the ground. Such a configuration enables delivery of 2500 gallons per minute (GPM) or more of water from the rear of the vehicle up to the front of the vehicle while maintaining enough structure to handle all of the loads the chassis experiences during operation and still have space to package the engine, fuel tank, hydraulics, electronics, and so on.

In accordance with certain embodiments, the chassis is made to bolt together and there are four main parts: a floor pan, a left hand side pod, a right hand side pod, and a water manifold. None of the loads experienced by the chassis are transferred directly to the water manifold. Rather, the water manifold is installed and isolated inside the chassis.

In certain use case implementations, the vehicle serves as a firefighting vehicle. Other use cases are suitable as well such as vehicles for chemical treatment, riot handling vehicles, and so on.

In the context of a firefighting robot, the vehicle is specially adapted to spray water (or other fluids) on fires. Smaller than firetrucks, firefighting robots are maneuverable and able to aim water accurately at desired targets. The Thermite robot available from Howe & Howe, Incorporated of Waterboro, ME, is a remote controlled, tracked vehicle with a remotely aimed nozzle (monitor) that can discharge up to 1,500 gallons of water per minute. The Thermite has the ability to withstand environments that are too hazardous for human personnel. Such a robot is suitable for use by various improvements disclosed herein.

It should be appreciated that the success of the Thermite may have encouraged development of ever more capable firefighting vehicles. One particular vehicle has been proposed that can supply up to 2,500 gallons of water per minute or more.

Unfortunately, increasing the rate of water discharge gives rise to many design challenges. These include management of mechanical stresses associated with moving so much water so quickly. They also include the need for physical stability. For example, it is essential that the vehicle does not flip itself over when discharging water at high speed. It is also essential for new designs to provide sufficient space for other components of the vehicle, such as an engine, fuel tank, hydraulics, and the like.

An improved technique addresses these challenges, in whole or in part, by providing a water manifold that receives water as input at a first end of the vehicle and provides water as output at a second end of the vehicle. The vehicle includes a chassis, and the chassis includes a support that holds the water manifold in a suspended condition, where it is decoupled from stresses applied to the vehicle. Thus, the vehicle may flex under high loads, but consequent flexure of the water manifold is largely attenuated.

In some aspects, the manifold includes a water tank disposed at or near the first end of the vehicle. The water tank has multiple ports adapted to receive water as input, e.g., from a firetruck. The water tank has first and second conduit members extending therefrom. The conduit members extend down respective sides of the vehicle toward the second end of the vehicle, where they join together to provide a single input to a water monitor.

In some aspects, a separation between the first and second conduit members provides space for accommodating other equipment of the vehicle, such as an engine.

In some aspects, the support that holds the manifold includes first and second cradles coupled to a base of the chassis on respective sides of the vehicle. The cradles have compliant liners that hold the first and second conduit members in the suspended condition. The compliant liners may be rubberized and/or air-filled, for example. Providing the conduit members near the base of the chassis reduces the tendency of the vehicle to flip backwards when water is ejected at high speed.

In some examples, the vehicle further includes a front cradle that securely holds the first and second conduit members at the second end of the vehicle.

In some aspects, the vehicle further includes first and second pods that cover and protect the first and second conduit members. According to some variants, the first and second pods each include an inverted cradle that holds the respective conduit member from above. The inverted cradles may be constructed as mirror images of the cradles attached to the base of the chassis and may likewise include compliant liners that further buffer the conduit members from vibration and/or strain.

According to some aspects, the water tank has a suspended connection to the chassis, e.g., on a rubberized and/or air-filled sheet, decoupling the water tank from the vehicle chassis.

Some embodiments are directed to a firefighting vehicle. Other embodiments are directed to a chassis for a firefighting vehicle. Other embodiments are directed to a water manifold for conveying water within a firefighting vehicle. Still other embodiments are directed to a firefighting method of dispensing water.

In accordance with certain embodiments, an improved technique for a firefighting vehicle provides a water manifold that receives water as input at a first end of the vehicle and provides water as output at a second end of the vehicle. The vehicle includes a chassis, and the chassis includes a support that holds the water manifold in a suspended condition, where it is decoupled from stresses applied to vehicle.

As used within this document, the words "comprising," "including," "containing," and "having" may be intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure. Such modifications and enhancements are intended to belong to various embodiments of the disclosure.

What is claimed is:

1. A tracked vehicle, comprising:
    a vehicle body defining a vehicle front, a vehicle rear, lateral sides extending between the vehicle front and the vehicle rear;
    a fluid delivery system supported by the vehicle body, the fluid delivery system including:
        an intake manifold disposed at the vehicle rear, the intake manifold being constructed and arranged to receive fluid from at least one external fluid source,
        an outlet disposed at the vehicle front, the outlet being constructed and arranged to distribute fluid from the at least one fluid source to an external target, and
        a set of fluid conduits coupled with the intake manifold and the outlet to convey the fluid from the intake manifold to the outlet through the vehicle body; and
    track assemblies coupled with the vehicle body, the vehicle body being disposed between the track assemblies to enable the track assemblies to provide stability to the tracked vehicle during high speed fluid discharge from the outlet;
    wherein the intake manifold is at least partly disposed within a rear portion of the vehicle body to direct the fluid from the at least one external fluid source into the vehicle body through the rear portion of the vehicle body.

2. The tracked vehicle of claim 1 wherein the set of fluid conduits is constructed and arranged to convey at least 1500 gallons of fluid per minute from the intake manifold to the outlet through the vehicle body.

3. The tracked vehicle of claim 2 wherein the vehicle body includes a floor plate portion; and
    wherein the set of fluid conduits includes at least one lateral conduit that extends across the floor plate portion from the intake manifold to the outlet.

4. The tracked vehicle of claim 2 wherein the vehicle body further defines a set of internal cavities; and
    wherein the tracked vehicle further comprises:
        a set of batteries disposed within the set of cavities defined by the vehicle body.

5. The tracked vehicle of claim 2, further comprising:
    a utility deck supported by the vehicle body.

6. The tracked vehicle of claim 5 wherein the utility deck is disposed at a height that is higher than the track assemblies.

7. The tracked vehicle of claim 6 wherein the utility deck defines a horizontal flat surface for supporting equipment.

8. The tracked vehicle of claim 6 wherein the utility deck extends from the vehicle rear to the vehicle front.

9. The tracked vehicle of claim 6 wherein the track assemblies include a left track assembly that extends along a left lateral side defined by the vehicle body, and a right track assembly that extends along a right lateral side defined by the vehicle body;
    wherein a left utility deck portion resides adjacent the left lateral side; and
    wherein a right utility deck portion resides adjacent the right lateral side.

10. The tracked vehicle of claim 9 wherein at least a portion of the left utility deck portion extends over the left track assembly; and
    wherein at least a portion of the right utility deck portion extends over the right track assembly.

11. The tracked vehicle of claim 2, further comprising:
    at least one fire retardant spraying portion constructed and arranged to provide fire retardant spraying.

12. The tracked vehicle of claim 11 wherein the at least one fire retardant spraying portion is disposed adjacent the vehicle front.

13. The tracked vehicle of claim 11, further comprising:
    a set of utility decks supported by the vehicle body; and
    wherein the at least one fire retardant spraying portion is disposed in front of the set of utility decks supported by the vehicle body.

14. The tracked vehicle of claim 11 wherein the at least one fire retardant spraying portion includes side portions constructed and arranged to provide fire retardant spraying.

15. The tracked vehicle of claim 11 wherein the at least one fire retardant spraying portion includes a top portion constructed and arranged to provide fire retardant spraying.

16. A method of delivering fluid, the method comprising:
    intaking the fluid through a tracked vehicle which includes:

a vehicle body defining a vehicle front, a vehicle rear, lateral sides extending between the vehicle front and the vehicle rear;

a fluid delivery system supported by the vehicle body, the fluid delivery system including:

an intake manifold disposed at the vehicle rear, the intake manifold being constructed and arranged to receive fluid from at least one external fluid source, an outlet disposed at the vehicle front, the outlet being constructed and arranged to distribute fluid from the at least one fluid source to an external target, and a fluid conduit coupled with the intake manifold and the outlet to convey the fluid from the intake manifold to the outlet through the vehicle body; and track assemblies coupled with the vehicle body, the vehicle body being disposed between the track assemblies to enable the track assemblies to provide stability to the tracked vehicle during high speed fluid discharge from the outlet;

releasing the fluid from the outlet toward the external target; and while fluid is continuing to be released from the outlet, driving the tracked vehicle over a ground surface;

wherein the intake manifold is at least partly disposed within a rear portion of the vehicle body to direct the fluid from the at least one external fluid source into the vehicle body through the rear portion of the vehicle body.

17. The method as in claim 16 wherein driving the tracked vehicle includes:

remotely controlling movement of the tracked vehicle from a location that is external to the tracked vehicle.

18. The method of claim 17 wherein the tracked vehicle further includes a utility deck supported by the vehicle body;

wherein the utility deck is disposed at a height that is higher than the track assemblies; and wherein the method further comprises:

carrying equipment on the utility deck while the movement of the tracked vehicle is remotely controlled from the location that is external to the tracked vehicle.

19. The tracked vehicle of claim 1 wherein the set of fluid conduits includes a set of horizontal conduits disposed within the vehicle body from the rear portion of the vehicle body to a front portion of the vehicle body.

20. The tracked vehicle of claim 1 wherein the vehicle body further defines a vehicle floor and a vehicle top above the vehicle floor, the set of fluid conduits being disposed closer to the vehicle floor than the vehicle top.

* * * * *